United States Patent [19]

Farrell, III et al.

[11] 4,179,050

[45] Dec. 18, 1979

[54] FLUID DISPENSING PISTON

[75] Inventors: Francis M. Farrell, III, Grant Township, Washington County; Robert B. Otto, Champlin; William J. Seim, Roseville, all of Minn.

[73] Assignee: Minnesota Mining and Manufacturing Company, Saint Paul, Minn.

[21] Appl. No.: 904,600

[22] Filed: May 10, 1978

[51] Int. Cl.$^2$ .......................... B67D 5/42; G01F 11/04

[52] U.S. Cl. .................................... 222/386; 206/384

[58] Field of Search ............ 222/386, 390, 391, 386.5, 222/326–327; 128/218 P, 218 M, 238, 234; 206/384; 92/181 R, 181 P; 91/422

[56] References Cited

U.S. PATENT DOCUMENTS

| | | | |
|---|---|---|---|
| 2,815,151 | 12/1957 | Collins | 222/327 |
| 3,076,456 | 2/1963 | Hunt, Sr. | 128/218 M |
| 3,315,847 | 4/1967 | Trumbull | 222/327 |
| 3,659,749 | 5/1972 | Schwartz | 128/218 M X |

FOREIGN PATENT DOCUMENTS

| | | | |
|---|---|---|---|
| 2358534 | 6/1974 | Fed. Rep. of Germany | 128/218 P |
| 276192 | 8/1927 | United Kingdom | 222/386.5 |

*Primary Examiner*—Charles A. Marmor

*Attorney, Agent, or Firm*—Cruzan Alexander; Donald M. Sell; Terryl K. Qualey

[57] ABSTRACT

A fluid dispensing piston for a cylindrical dispensing tube has a recessed transverse end wall formed with at least one aperture. The aperture is normally covered by a fluid seal removably retained on the exterior surface of the end wall. The piston is placed in a cylindrical dispensing tube with the exterior of the end wall pressing against the fluid in the tube and the piston is moved axially down the tube to dispense the fluid. Further fluid may then be added to the tube and a second piston moved axially down the tube to dispense that fluid, the conformable material covering the aperture in the end wall of the first piston being forced away from the end wall to uncover the apertures as the second piston is moved down the tube to create a pathway for the fluid through the first piston.

8 Claims, 4 Drawing Figures

FLUID DISPENSING PISTON

FIELD OF THE INVENTION

The present invention relates to a fluid dispensing piston for a cylindrical dispensing tube.

BACKGROUND OF THE INVENTION

Cylindrical tubes having a dispensing nozzle at one end and a piston at the opposed end which is slidable axially in the tube to dispense a fluid from the tube are in widespread use. Various piston configurations have been utilized to effectively dispense the fluid from the cartridge, as disclosed in U.S. Pat. Nos. 2,115,591; 2,920,797; 3,066,836; and 3,439,839. Similar pistons are also utilized in cylindrical cartridges providing for mixing of two or more components contained in the cartridge and subsequent dispensing of the mixture, as disclosed in U.S. Pat. Nos. 3,217,946; 3,188,057; 3,197,067; and 3,858,853. In these prior art cartridges, when the dispensing piston has moved the length of the tube and dispensed the fluid therein, the piston must be removed if the cartridge is to be reused. Most often, the cartridge is simply thrown away.

In applications where the contents of several cartridges are necessary to complete a job, for example when injecting a water excluding fluid into a splice of a large telephone cable, it would be advantageous to utilize the same cartridge for several fills of liquid if this could be readily accomplished. Removal and reuse of the piston has not proven to be desirable.

SUMMARY OF THE INVENTION

The fluid dispensing piston of the present invention is constructed for use in a cylindrical dispensing tube. It comprises a plastic body having a hollow cylindrical sealing portion with an outside diameter equal to the internal diameter of the dispensing tube and a transverse wall spanning the body. The transverse wall is recessed axially inward from the ends of the body and it is formed with at least one aperture. A fluid seal is retained on one face of the transverse wall over said aperture and is movable away from the transverse wall in response to fluid pressure applied to the opposite face of the transverse wall to permit fluid to flow through the aperture only from the opposite face toward the one face.

The piston is placed in a dispensing tube with the exterior face of the transverse wall pressing against the fluid in the tube. The piston is moved axially down the tube to dispense the fluid from the tube. When the piston has been moved fully to the dispensing end of the tube, the tube may be refilled behind the piston and a second piston placed in the end of the tube and moved axially down the tube. The pressure of the movement of the second piston against the fluid displaces the fluid seal covering the aperture in the transverse wall in the first piston and thus creates a path for the fluid pressed by the second piston. The recess of the transverse wall from the ends of the piston body provides a space for movement of the seal. Further fluid and pistons may be added in like manner.

THE DRAWINGS

In the Drawing

Figure 1:
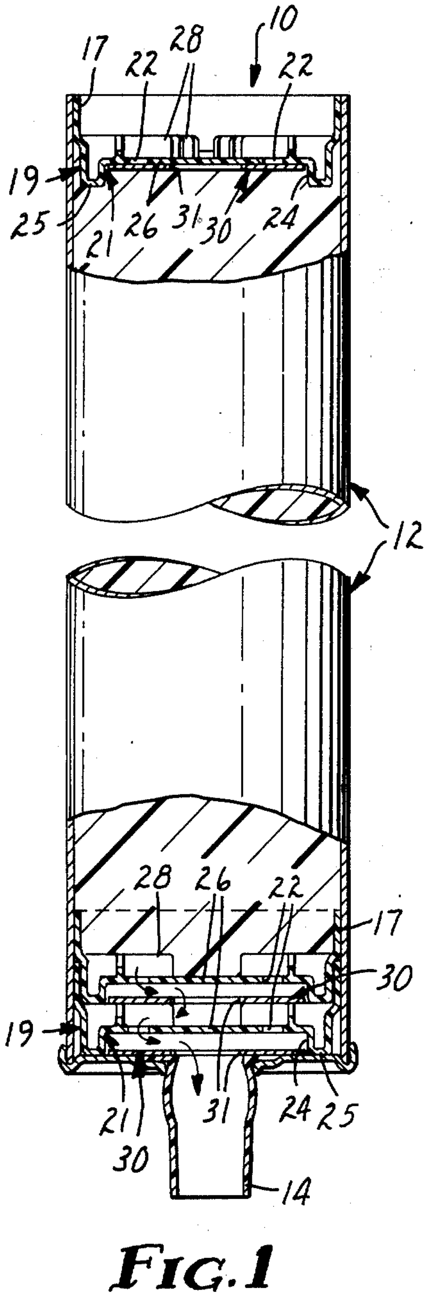
FIG. 1 is a longitudinal view partially in section of a dispensing tube with three fluid dispensing pistons, constructed in accordance with the present invention, in various stages of use.
Figure 2:
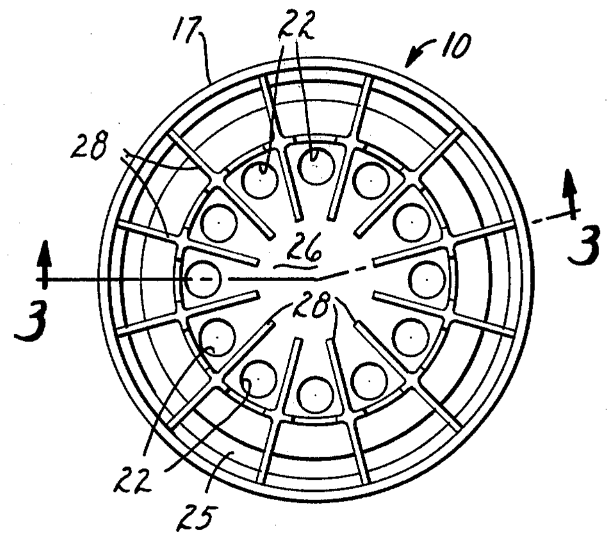
FIG. 2 is a plan view of one of the pistons.
Figure 3:
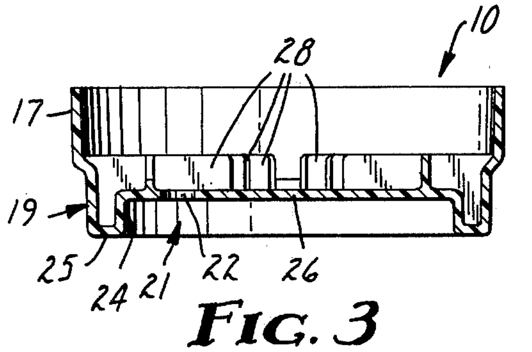
FIG. 3 is a cross sectional view taken generally along line 3—3 of FIG. 2.
Figure 4:
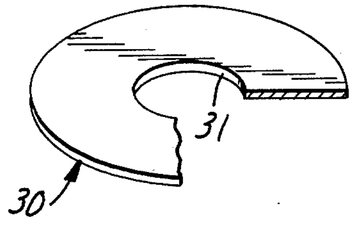
FIG. 4 is a perspective view, partially in section, of the fluid seal forming a portion of the piston.

The illustrated fluid dispensing pistons 10 are constructed for use in the common cylindrical caulking tube 12 having one open end and a disensing nozzle 14 extending centrally from an end wall across the other end of the tube.

The piston 10 of the present invention has a plastic body having a hollow cylindrical sealing portion 17 with an outside diameter equal to the internal diameter of the tube 12 to seal the open end of the tube 12 to prevent the fluid from escaping around the piston 10 when pressure is applied to the piston to dispense the fluid from the tube. The plastic body also includes a cylindrical stacking portion 19 extending coaxially from the sealing portion 17 and having an outside diameter less than the internal diameter of the sealing portion so that the stacking portion 19 of one piston 10 will fit within the sealing portion 17 of an adjacent piston.

A transverse wall 21 spans the stacking portion 19 of the body, is recessed axially inward from the ends of the body and is formed with a plurality of apertures 22 spaced about the axis of the stacking portion 19. In the illustrated embodiment, a planar peripheral rim 25 is formed at the end of the stacking portion 19 and an axial step 24 extends from the peripheral rim to the planar transverse wall at a constant radius around the axis of the stacking portion 19.

A plurality of ribs 28 are formed on the internal face of the transverse wall 21 facing the sealing portion 17 of the piston 10. The ribs 28 are spaced about the axis of the stacking portion 19 between the apertures 22 and extend from the transverse wall 21 axially of the stacking portion 19 a distance less than the axial length of the stacking portion 19. In the illustrated embodiment the apertures 22 in the transverse wall 21 are uniformly spaced in a ring around the center of the transverse wall 21, and the ribs 28 extend radially across the transverse wall 21 and terminate spaced from the center of the transverse wall and from each other, there being one rib 28 between each pair of adjacent apertures 22.

A thin fluid seal 30 is retained on the face of the transverse wall 21 opposite the ribs 28 and covers the apertures 22 in the transverse wall 21. The seal 30 in the illustrated embodiment is a die cut ring which is preferably formed of paper with a releasable pressure sensitive adhesive bonding it to the transverse wall 21.

In use, the caulking tube 12 is filled with fluid and a piston 10 is inserted into the end of the tube. The tube is then placed in a gun and the piston 10 is pushed axially down the tube 12, for example by a ratchet mechanism, to dispense the fluid through the dispensing nozzle 14. When the first piston 10 is moved the full length of the tube 12 and against the dispensing end thereof, the tube 12 may be recharged with fluid from a bulk container and a second piston placed in the open end of the tube. Movement of the second piston axially down the tube applies pressure through the fluid to the seal 30 on the first piston forcing it away from the transverse wall 21 and against the dispensing end of the tube to create a fluid path through the apertures 22 in the transverse wall 21 of the first piston and the aperture 31 in the seal 30 and then through the dispensing nozzle 14.

When the second piston 10 has been moved fully into contact with the first piston its stacking portion 19 fits within the sealing portion 17 of the first piston and the rim 25 of its transverse wall 21 rests on the ribs 28 extending from the transverse wall of the first piston 10. The tube 12 may then be charged with further fluid and a third piston 10 placed in the open end of the tube. Movement of the third piston applies pressure through the fluid and forces the seal 30 on the second piston away from the transverse wall 21 and against the ribs 28 on the first piston. A fluid path is then created through the apertures 22 in the second piston, the aperture 31 in the seal 30 removed from the second piston, between the ribs 28 on the first piston, through the apertures 22 in the transverse wall 21 of the first piston and then through the aperture 31 in the seal 30 removed from the first piston and out of the dispensing nozzle 14. The provision that the ribs 28 extend from the transverse wall 21 axially of the stacking portion 19 a distance less than the axial length of the stacking portion 19 always assures that when two pistons are stacked on each other as in FIG. 1, there will be a space for the seal 30 between the apertured central portion 26 of the transverse wall 21 and the ribs 28 for movement of the seal 30 of the upper piston away from the apertures 22 to create a fluid flow path.

In one specific embodiment, pistons 10 are constructed of polypropylene. The outside diameter of the sealing portion 17 is 4.72 centimeters at its free end and is reduced to a diameter of 4.67 centimeters at its connection to the stacking portion 19 with an axial length of 0.84 centimeter to provide a taper in the sealing portion 17 which assures proper sealing of the tube and dispensing of the fluid. The stacking portion 19 has an outside diameter of 4.47 centimeters and an axial length of 0.75 centimeter. The central portion 26 of the transverse wall 21 has a diameter of 3.62 centimeters, the height of the step 24 in the transverse wall 21 is 0.38 centimeter and the ribs 28 extend from the transverse wall 21 a distance of 0.39 centimeter. The apertures 22 are located on a circle having a diameter of 2.46 centimeters and each aperture 22 has a diameter of 0.38 centimeter. The ends of the ribs 28 are spaced in a 1.27 centimeter diameter circle around the center of the central portion 26 of the transverse wall 21.

The seal 30 is die cut from a 0.013 centimeter thick sheet of paper having one vapor coated metallized surface and the opposite surface coated with a removable pressure sensitive adhesive. One such sheet material is available as Bright Silver Foil Removable Tape, from the Tapemark Company of West Saint Paul, Minnesota. The seal 30 has a diameter of 3.51 centimeters and the aperture 31 therein has a diameter of 1.27 centimeters.

We claim:

1. A fluid dispensing piston for a cylindrical dispensing tube, comprising:
 a plastic body having a hollow cylindrical sealing portion with an outside diameter equal to the internal diameter of a said tube,
 a cylindrical stacking portion extending coaxially from said sealing portion and having an outside diameter less than the internal diameter of said sealing portion, and
 a transverse wall spanning said body, said transverse wall being recessed axially inward from the ends of said body and being formed with at least one aperture therethrough, and
 a fluid seal retained on one face of said transversewall over said aperture and movable away from said transverse wall in response to fluid pressure applied to the opposite face of said transverse wall to permit fluid to flow through said aperture only from said opposite face toward said one face.

2. The fluid dispensing piston of claim 1 wherein said transverse wall spans said stacking portion.

3. The piston of claim 2 including a planar peripheral rim at the end of said stacking portion and an axial step from said peripheral rim to said transverse wall at a constant radius around the axis of said stacking portion and wherein said transverse wall is planar.

4. The fluid dispensing piston of claim 3 including a plurality of ribs on said opposite face of said transverse wall, said ribs being spaced about the axis of said stacking portion between said apertures and extending from said transverse wall axially of said body to support a ring, shaped fluid seal removed by fluid pressure from the transverse wall of an adjacent piston.

5. The piston of claim 4 wherein said ribs on said transverse wall extend radially thereof and terminate spaced from the center of said transverse wall and from each other.

6. The piston of claim 5 wherein said apertures in said transverse wall are spaced equally from each other in a ring around the center of said transverse wall and wherein there is a said rib between adjacent apertures.

7. The fluid dispensing piston of claim 1, 2 or 3 wherein said transverse wall is formed with a plurality of apertures spaced about its center and wherein said fluid seal is in the shape of a ring, said ring being releasably bonded to said one face of said transverse wall.

8. A fluid dispensing piston for a cylindrical dispensing tube, comprising:
 a plastic body having
 a hollow cylindrical sealing portion with an outside diameter equal to the internal diameter of a said tube,
 a transverse wall spanning said body, said transverse wall being recessed axially inward from the ends of said body and being formed with a plurality of apertures spaced about its center, and
 a fluid seal in the shape of a ring, said ring being releasably bonded to one face of said transverse wall over said apertures and movable away from said transverse wall in response to fluid pressure applied to the opposite face of said transverse wall to permit fluid to flow through said apertures only from said opposite face toward said one face.

* * * * *